United States Patent [19]

Croese

[11] 4,228,966

[45] Oct. 21, 1980

[54] SATELLITE REEL

[75] Inventor: Hendrik M. W. Croese, Vlaardingen, Netherlands

[73] Assignee: Ir. H.M.W. Croese Raadgevend, Vlaardingen, Netherlands

[21] Appl. No.: 62,938

[22] Filed: Aug. 2, 1979

[30] Foreign Application Priority Data

Jan. 25, 1979 [NL] Netherlands .................. 7900609

[51] Int. Cl.³ ........................................... B65H 75/00
[52] U.S. Cl. .................................................. 242/54 R
[58] Field of Search ............... 242/54 R, 55.01, 55.16, 242/67.1 R, 67.4

[56] References Cited

U.S. PATENT DOCUMENTS

| | | | |
|---|---|---|---|
| 3,128,857 | 4/1964 | Walton | 242/54 R X |
| 3,467,360 | 9/1969 | Mizell | 242/54 R X |
| 3,545,693 | 12/1970 | Gurner | 242/54 R |

*Primary Examiner*—Edward J. McCarthy

*Attorney, Agent, or Firm*—Scully, Scott, Murphy & Presser

[57] ABSTRACT

A reel, in particular an intermediate or storage reel for provisionally receiving a variable cable length between a stationary end and a movable end of a cable. The reel is characterized by a stationarily mounted central drum which is fitted with a cable receiving groove extending helically over its drum surface and having a connection to an axial cable passage for a stationary cable end, and at least two satellite drums, each having the same diameter as the central drum and each likewise being fitted in its surface with a helical cable-receiving groove of the same pitch as that of the central drum, but oppositely directed with respect thereto. The satellite drums are rotatable about the central drum and simultaneously rotatable about their own axes such that the oppositely disposed portions of the respective grooves are capable of always receiving a portion of the cable between them.

2 Claims, 2 Drawing Figures

SATELLITE REEL

BACKGROUND OF THE INVENTION

1. Field of the Invention

The invention relates in general to a cable reel, and more particularly to an intermediate or storage reel for temporarily receiving a variable cable length between a stationary end and a movable end of the cable. The term "cable" as used herein and in the accompanying claims means an electric conductor, a hydraulic or pneumatic line and also hybrid combinations thereof.

2. Discussion of the Prior Art

With reels that are arranged between a stationary apparatus, e.g., a measuring or control station on one end and a movable apparatus, for instance a measuring probe or a remote control apparatus on the other end, twisting of the cable during rotation of the reel is a frequent problem which is desirable to avoid.

In the case of hydraulic lines, a rotary fluid clutch is frequently used with a stationary portion and a second portion rotatable relative thereto, with suitable seals being disposed between the two portions. The stationary portion of so-called Rotary Seals or Swivels is connected to stationary apparatus, e.g., a fluid source, while the rotary portion thereof is connected to the reel. Analogous constructions are also known for pneumatic lines and for fibre optic cables. In electrical conductors, slip ring connections are frequently used wherein for each conductor a carbon brush is connected to the non-rotary apparatus, e.g., a measuring station for the portal of a mobile crane, and for each conductor a slip ring is mounted in co-rotational relationship with the reel. The prior art aids described above are sufficient with a limited or small number of fluid lines or conductors per cable. Furthermore, a plug connection may also be used which is released during reel rotations. However, this may present problems if a specific fluid pressure or electrical voltage must be maintained constantly in the cable.

However, substantial problems are encountered with more complex cables, such as cables that are composed of a plurality of fluid lines or electric conductors or combinations thereof. For instance, in mobile transport installations it is generally necessary not only to supply continuous electric power, but often other electric connections must also be maintained continuously for control, locking, communication, measurement of lifted weights or of transported quantities and the like. Practical constructional problems not only impose a restriction on the possible number of slip rings, but also these electric connections are often unreliable because of variations in the transitional resistance across the slip ring connections. Also, another example is found in seismic operations at sea wherein use may be made of a measuring probe maintained a variable distance from a ship by means of a float. In these arrangements a cable comprising many electric conductors and/or hydraulic lines is enclosed by a jacket, and is coupled to a computer on the ship. The length of this cable should be frequently changed, for instance for adaptation to local conditions or for maintenance operations on the measuring probe. To prevent twisting, which is unallowable for such cables, prior art aids, such as the above-mentioned rotary clutches or slip ring contacts are not adequate, partially because contaminated slip rings have an excessive adverse effect upon the inetlligence signals which have a magnitude in millivolts. In view thereof, it has been necessary heretofore, during retrieval of the measuring probe to arrange the cable on the deck in some fashion in loops or to suspend the same. Since this operation has to be accomplished very carefully, the retrieval and letting out of a measuring probe is a time-consuming operation, and often takes several hours.

SUMMARY OF THE INVENTION

It is an object of the present invention to eliminate these drawbacks in the prior art while providing a storage or intermediate reel for receiving substantial cable lengths without encountering the above-described detrimental twisting of the cable.

According to the present invention, a reel is fitted with a stationarily mounted central drum which is fitted with a cable-receiving groove extending helically across the drum surface, with a connection being provided to an axial cable passage for a stationary cable end, and at least two satellite drums, each having the same diameter as the central drum, and each likewise having in its surface a helical cable-receiving groove having the same pitch as that of the central drum, but oppositely directed with respect thereto. The satellite drums are rotatable about the central drum and are simultaneously caused to rotate about their own axes in such a way that the oppositely disposed portions of the respective grooves are always capable of taking up a portion of the cable between them.

In a reel constructed pursuant to the present invention, the stationary end of a cable is guided through radial and axial passages in the central drum. The cable is wound by rotation of the satellite drums about the central drum, while the cable is supplied tangentially to the satellite drums. No twisting of the cable occurs because the central drum is stationary. The winding of the central drum is effected from one of the satellite drums which positions and lays the cable over a part of its circumference in the cable-receiving groove during its rotation about the central drum. The take-up groove of the central drum is thus wound or filled from one end of the drum. Simultaneously therewith, the cable is wound about the assembly of satellite drums, so that a comparatively large length of cable can be coiled by means of a reel of comparatively small overall dimensions.

The accurate positioning of the cable in the groove of the central drum by means of a satellite drum is only possible if, as stated above, the oppositely disposed portions of the respective grooves are always capable of taking up a portion of the cable between them, viz. preferably apporximately fittingly between them. Stated differently, the opposite helices of the central drum on the one end and of all the satellite drums on the other end should always remain accurately positioned opposite each other during the movement of the satellite drums about the central drum.

One embodiment wherein this can be ensured in a constructionally simple manner provides the central drum and the satellite drums at their ends with identical coacting gears, with the satellite drums being rotatably mounted in a cage rotatable about the central axis of the central drum. Upon rotation of the cage, the planetary gears of the satellite drums rotate about the sun gear of the central drum so that the satellite drums are caused to rotate about their own axes.

When heavy cables are utilized, the reel does not provide the tensile force for pulling in the cable. In those instances a two-sided cable pulling device may be provided in a known manner which is adapted to supply the cable to the reel or respectively draw the cable therefrom. A light motor is also provided to constantly drive the cage in the winding direction. When cable is supplied to the reel, the motor ensures winding up of the cable, and when the cable is withdrawn from the reel, the reel drives the motor in reverse.

One important and advantageous feature of a reel according to the present invention is the attribute that not only is the cable supplied or withdrawn at one level (the top or bottom of the track of the satellite drums), but it also is supplied or withdrawn in the same axial zone. This advantageous feature results as during coiling of the cable, the exterior cable winding on the assembly satellite drums is automatically advanced as the interior winding is completed and vice versa.

A reel constructed according to the teachings of the present invention and having four satellite drums attains a capacity increase of greater than 25% in comparison with a conventional single drum.

BRIEF DESCRIPTION OF THE DRAWINGS

One embodiment of the satellite reel according to the present invention will now be explained, by way of example, with reference to the accompanying drawings, wherein.

DETAILED DESCRIPTION OF THE DRAWINGS

Figure 1:
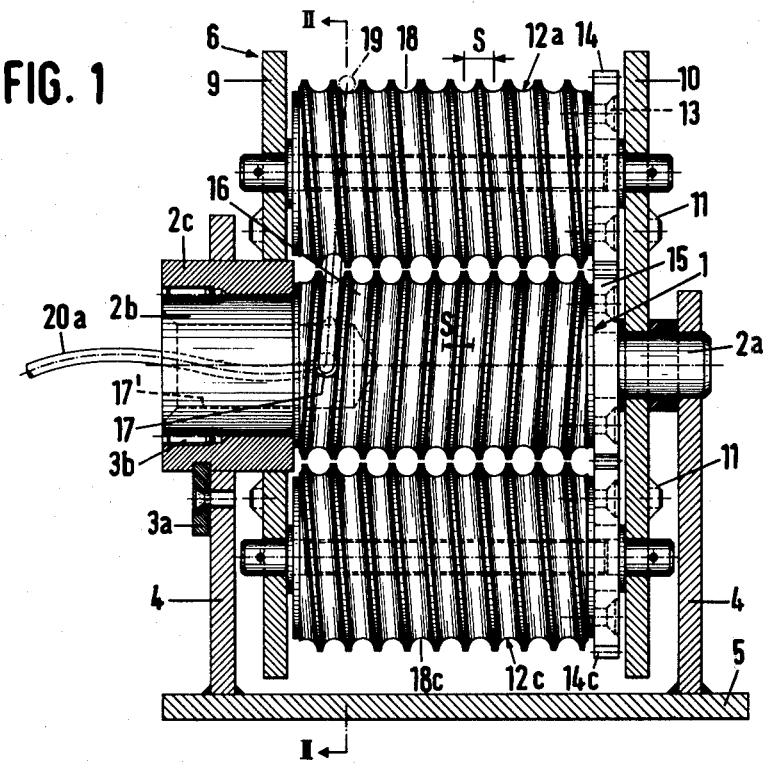
FIG. 1 is a diagrammatic side view of the reel, partly in cross-section on the line I—I in FIG. 2.

Referring to the drawings in detail, a central drum 1 is stationarily mounted in lateral supports 4, resting on a baseplate 5, via trunnions 2a, 2b, a sleeve 2c and locking means 3a and 3b. A cage 6 is rotatably mounted on trunnion 2a and sleeve 2c, and is rotatably driven by means of a light hydraulic motor 7 and a rope 8. The cage 6 is composed of end plates 9 and 10 which are coupled together by rods 11. Four satellite drums 12a–d are rotatably mounted in cage 6. Each satellite drum is fitted with a planetary gear 14 fixedly connected thereto by means of screws 13, and the central drum 1 is fitted with a sun gear 15 also fixedly connected thereto.

The diameters of the drums 1 and 12a–d are identical, and the gears therefor 15 and 14 are also identical.

A helical cable-receiving groove 16 is formed in the face of the central drum, and communicates via a radial cable passage 17 with an axial cable passage 16'. The groove 16 extends over the drum with a left-handed helix having a pitch S.

Cable-receiving helical grooves 18 are formed in the face of each of the satellite drums 12a–d, and each helical groove has the same pitch S as the groove 16, but is formed with a right-handed helix. The drums 1 and 12a–d are so interconnected via the respective gears 15 and 14 that, irrespective of the rotational position of the cage 6, the oppositely disposed portions of the groove 16 on the one end and the grooves 18 on the other end can reasonably fittingly enclose cable lengths disposed in situ.

Figure 2:
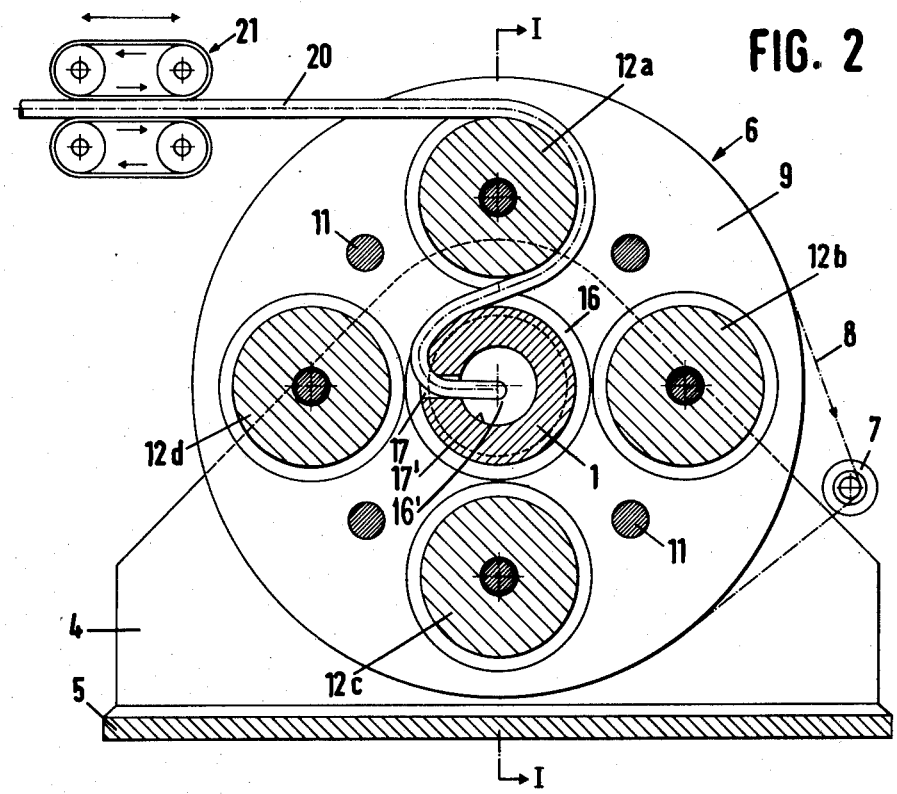
FIG. 2 is a cross-section on line II—II in FIG. 1.

FIG. 2 illustrates the manner in which a cable 20, supplied by a cable pulling device 21, is wound about drum 12a and is conducted, via the groove portion disposed in FIG. 1 at the back of said drum, to the central drum 1. The stationary end 20a of the cable extends through the passages 17 and 17', and may be connected to a stationary device. To reel in the cable, the reel in FIG. 2 is turned clockwise so that the cable is wound about the assembly of satellite drums 12a–d. Simultaneously therewith, the groove 16 of the stationary central drum 1 is filled via the satellite drum 12a, thus forming two windings (one external winding over the assembly of satellite drums and one internal winding on the central drum) without the occurrence of cable twisting.

What is claimed is:

1. A storage reel for provisionally receiving a variable cable length between a stationary end and a movable end of the cable, characterized by a central drum which is stationary mounted and is fitted with a cable-receiving groove extending helically over the drum surface, with a connection to an axial cable passage for a stationary cable end, and at least two satellite drums, each having the same diameter as the central drum and each likewise being fitted in its drum surface with a helical cable-receiving groove of the same pitch as that of the central drum, however oppositely directed with respect to the pitch of the central drum, said satellite drums being rotatable about the central drum and simultaneously about their own axes, such that the oppositely disposed portions of the respective grooves take up a portion of the cable between them.

2. A reel according to claim 1, characterized in that the central drum and the satellite drums are provided with identical coacting gears, with the gear on the central drum being a sun gear and the gears on the satellite drums being planetary gears coacting with said sun gear, a cage rotatably mounted about the central axis of the central drum, said satellite drums being rotatably mounted in said cage, such that rotation of the cage causes the planetary gears of the satellite drums to rotate about the sun gear of the central drum to rotate the satellite drums their own central axes.

* * * * *